(12) United States Patent
Geng et al.

(10) Patent No.: US 11,402,688 B2
(45) Date of Patent: Aug. 2, 2022

(54) DISPLAY DEVICE AND BACKLIGHT MODULE

(71) Applicants: Beijing BOE Display Technology Co., Ltd., Beijing (CN); BOE TECHNOLOGY GROUP CO., LTD., Beijing (CN)

(72) Inventors: Shixin Geng, Beijing (CN); Yu Zhang, Beijing (CN); Bochang Wang, Beijing (CN); Jiangfeng Zhang, Beijing (CN); Xu Chen, Beijing (CN)

(73) Assignees: Beijing BOE Display Technology Co., Ltd., Beijing (CN); BOE TECHNOLOGY GROUP CO., LTD, Beijing (CN)

(*) Notice: Subject to any disclaimer, the term of this patent is extended or adjusted under 35 U.S.C. 154(b) by 0 days.

(21) Appl. No.: 17/059,533

(22) PCT Filed: Nov. 20, 2019

(86) PCT No.: PCT/CN2019/119699
§ 371 (c)(1),
(2) Date: Nov. 30, 2020

(87) PCT Pub. No.: WO2021/097708
PCT Pub. Date: May 27, 2021

(65) Prior Publication Data
US 2021/0373384 A1   Dec. 2, 2021

(51) Int. Cl.
*G02F 1/13357* (2006.01)
*G02F 1/1339* (2006.01)

(52) U.S. Cl.
CPC .... *G02F 1/133603* (2013.01); *G02F 1/13394* (2013.01); *G02F 1/133605* (2013.01); *G02F 1/133608* (2013.01)

(58) Field of Classification Search
CPC ......... G02F 1/133603; G02F 1/133605; G02F 1/133608; G02F 1/13394; G02F 1/1336
See application file for complete search history.

(56) References Cited

U.S. PATENT DOCUMENTS

| | | | |
|---|---|---|---|
| 8,337,070 B2 | 12/2012 | Huang et al. | |
| 2012/0026423 A1* | 2/2012 | He | G02B 6/0068 349/62 |

(Continued)

FOREIGN PATENT DOCUMENTS

| | | |
|---|---|---|
| CN | 102913862 A | 2/2013 |
| CN | 104197242 A | 12/2014 |

(Continued)

OTHER PUBLICATIONS

Written Opinion for International Application No. PCT/CN2019/119699 dated Aug. 12, 2020.

*Primary Examiner* — Tracie Y Green
(74) *Attorney, Agent, or Firm* — Perilla Knox & Hildebrandt LLP; Kenneth A. Knox (57) ABSTRACT

The present disclosure relates to an electronic apparatus, a display device, and a backlight module, and relates to relates to the field of display technologies. The backlight module includes a back panel, a light guide plate and a light bar. The back panel has a bottom plate and a peripheral plate surrounding edges of the bottom plate, the peripheral plate is provided with a limit structure protruding into an area surrounded by the peripheral plate; the light guide plate is provided within the peripheral plate; the light bar is provided between the peripheral plate and the light guide plate and abutting against the limit structure to be blocked by the limit structure in at least one of a direction perpendicular to the bottom plate and a circumferential direction of the peripheral plate.

16 Claims, 8 Drawing Sheets

(56) References Cited

U.S. PATENT DOCUMENTS

| | | | |
|---|---|---|---|
| 2012/0033446 A1 | 2/2012 | Huang et al. | |
| 2013/0321496 A1* | 12/2013 | Weller | G02B 6/0078 |
| | | | 345/694 |
| 2014/0132884 A1* | 5/2014 | Yu | G02F 1/133308 |
| | | | 349/62 |
| 2016/0273742 A1* | 9/2016 | Hsieh | G02F 1/133308 |

FOREIGN PATENT DOCUMENTS

| | | |
|---|---|---|
| CN | 104197242 B | 2/2017 |
| CN | 206400218 U | 8/2017 |
| CN | 206906753 U | 1/2018 |
| CN | 105988244 B | 4/2020 |
| CN | 111198457 A | 5/2020 |
| WO | 2014071648 A1 | 5/2014 |
| WO | 205261323 U | 5/2016 |
| WO | 105988244 A | 10/2016 |
| WO | 109884816 A | 6/2019 |

\* cited by examiner

DISPLAY DEVICE AND BACKLIGHT MODULE

CROSS-REFERENCE TO RELATED APPLICATION

The present application is a 35 U.S.C. § 371 national phase application of International Patent Application No. PCT/CN2019/119699 filed on Nov. 20, 2019, the entire contents of which being incorporated by reference in their entirety herein.

TECHNICAL FIELD

The present disclosure relates to the field of display technologies and, in particular, to an electronic apparatus, a display device, and a backlight module.

BACKGROUND

At present, liquid crystal display panels have been widely used in various electronic apparatuses such as mobile phones and televisions. A backlight module is an important part of the liquid crystal display panel. A side-in backlight module is a commonly used one, which generally includes components such as a light bar and a light guide plate. Vibration during use often damages internal components of the backlight module and affects light-exiting effect, thus adversely affecting the display effect.

It should be noted that contents disclosed in the Background section above is only for enhancing the understanding of the background of the present disclosure, and thus may include contents that do not constitute prior art known to those of ordinary skill in the art.

SUMMARY

The present disclosure aims to provide an electronic apparatus, a display device, and a backlight module, so as to solve one or more problems caused by limitations and defects of the related art to some extent.

According to an aspect of the present disclosure, a backlight module is provided, including: a back panel with a bottom plate and a peripheral plate surrounding edges of the bottom plate, where the peripheral plate is provided with a limit structure protruding into an area surrounded by the peripheral plate; a light guide plate disposed within the peripheral plate; and a light bar, disposed between the peripheral plate and the light guide plate and abutting against the limit structure such that the light bar is blocked by the limit structure in at least one of a direction perpendicular to the bottom plate and a circumferential direction of the peripheral plate.

In an exemplary embodiment of the present disclosure, the limit structure includes: a stopper, provided on an inner surface of the peripheral plate, where an end of the light bar abuts against the stopper such that the light bar is blocked by the stopper in the circumferential direction of the peripheral plate.

In an exemplary embodiment of the present disclosure, the number of light bars is multiple, and the light bars are sequentially arranged along a straight line with any two adjacent light bars abutting against each other, and one of two light bars at two ends abuts against the stopper.

In an exemplary embodiment of the present disclosure, the stopper is provided with a buckle at a position corresponding to the light bar, and the light bar is provided with a groove at a position corresponding to the buckle, the buckle is engaged with the groove; or the stopper is provided with the groove at the position corresponding to the light bar, and the light bar is provided with the buckle at the position corresponding to the groove, the buckle is engaged with the groove.

In an exemplary embodiment of the present disclosure, the limit structure includes: a clamping edge, provided on an edge of the peripheral plate facing away from the bottom plate and extending toward the light guide plate, where the light bar is limited between the bottom plate and the clamping edge such that the light bar is blocked by the clamping edge in an axial direction of the peripheral plate.

In an exemplary embodiment of the present disclosure, a limit groove is provided on a side of the light bar facing away from the bottom plate, and the clamping edge is engaged with the limit groove.

In an exemplary embodiment of the present disclosure, the light bar includes a driving substrate, a light emitting element and a spacer, the driving substrate abuts against the limit structure, the light emitting element and the spacer are both provided on a surface of the driving substrate close to the light guide plate, and a height of the spacer is greater than a height of the light emitting element.

In an exemplary embodiment of the present disclosure, the backlight module further includes: an elastic liner, provided on an inner side of the peripheral plate and including a support portion and a limit portion, where the support portion is located on the bottom plate, the limit portion is provided on a surface of the support portion facing away from the bottom plate and is attached to an inner wall of the peripheral plate, and the limit portion is sandwiched between the light guide plate and the peripheral plate.

In an exemplary embodiment of the present disclosure, the peripheral plate is formed by a plurality of side plates, and a notch is formed between adjacent two side plates; the elastic liner includes multiple elastic liners, and each of the elastic liners has a one-to-one correspondence with the notch, where each of the elastic liners further includes: a filling part, located on a surface of the limit portion facing away from the light guide plate, and filled in the corresponding notch.

In an exemplary embodiment of the present disclosure, the backlight module further includes: a reflection sheet, provided within the peripheral plate, and the reflection sheet is at least partially located between the light guide plate and the support portion, and an edge of the reflection sheet is matched with each limit portion.

In an exemplary embodiment of the present disclosure, the edge of the reflective sheet is provided with an avoidance notch matched with the limit portion, and a side of the reflective sheet corresponding to the light bar is provided with a support sheet abutting against the light bar.

In an exemplary embodiment of the present disclosure, an outer side of the peripheral plate is provided with a hook, and the backlight module further includes: a plastic frame, surrounding the peripheral plate, the plastic frame is provided with a clamping hole at a position corresponding to the hook, and the hook is snapped into the clamping hole; an outer frame, sleeved outside the plastic frame, and side walls of the outer frame is provided with a cutout, and a bump is provided on an outer periphery of the plastic frame, and the bump is filled in the cutout.

In an exemplary embodiment of the present disclosure, the peripheral plate is provided with a mounting hole, and a surface of the peripheral plate facing away from the bottom plate is provided with a positioning stage protruding in a direction away from the bottom plate, a projection of the positioning stage on the bottom plate covers a projection of the mounting hole on the bottom plate, the plastic frame is provided with a positioning groove at a position corresponding to the positioning stage, and positioning stage is limited to the positioning groove.

According to an aspect of the present disclosure, there is provided a display device including the backlight module according to any one of the above.

According to an aspect of the present disclosure, there is provided an electronic apparatus including the display device described in any one of the above.

The electronic apparatus, the display panel and the backlight module of the present disclosure can limit the light bar in at least one of the axial and circumferential directions of the peripheral plate through the limit structure, so that the light bar is not easy to shake, so as not to affect the light-exiting effect, thereby ensuring the display effect. At the same time, during assembly, the position of the light bar can be limited by the limit structure, which is convenient for quick and accurate installation of the light bar, and is beneficial to reducing installation errors.

It should be noted that the above general description and the following detailed description are merely exemplary and explanatory and should not be construed as limiting of the disclosure.

BRIEF DESCRIPTION OF THE DRAWINGS

The accompanying drawings, which are incorporated in the specification and constitute a part of the specification, show exemplary embodiments of the present disclosure. The drawings along with the specification explain the principles of the present disclosure. It is apparent that the drawings in the following description show only some of the embodiments of the present disclosure, and other drawings may be obtained by those skilled in the art without departing from the drawings described herein.

DETAILED DESCRIPTION

Example embodiments will now be described more fully with reference to the accompanying drawings. However, the embodiments can be implemented in a variety of forms and should not be construed as being limited to the examples set forth herein; rather, these embodiments are provided so that this disclosure will be more complete so as to convey the idea of the exemplary embodiments to those skilled in this art. The same reference numerals in the drawings denote the same or similar parts, and the detailed description thereof will be omitted. In addition, the drawings are merely schematic representations of the present disclosure and are not necessarily drawn to scale.

Although the relative terms such as "above" and "below" are used in the specification to describe the relative relationship of one component to another component shown, these terms are only used for convenience in this specification, for example, according to an exemplary direction shown in the drawings. It will be understood that if the device shown is flipped upside down, the component described "above" will become the component "below". When a structure is "on" another structure, it may mean that a structure is integrally formed on another structure, or that a structure is "directly" disposed on another structure, or that a structure is "indirectly" disposed on another structure through other structures.

The terms "one", "a", "the", "said", and "at least one" is used to indicate that there are one or more elements/components or the like; the terms "include", "contain" and "have" are used to indicate an open type meaning of including and means that there may be additional elements/components/etc. in addition to the listed elements/components/etc.

The description of reference signs used in drawings include: 1. back panel; 101, bottom plate; 102, peripheral plate; 1021, limit structure; 10211, stopper; 10212, clamping edge; 1023, hook; 1024, positioning port; 1025, threading port; 1026, baffle 1027, positioning stage; 1028, buckle; 1029, groove; 103, notch; 2, light guide plate; 3, light bar; 31, drive substrate; 312, limit groove; 32, light emitting element; 33, spacer; 4, elastic liner; 41, support portion; 42, limit part; 43, filling part; 5, reflective sheet; 51, avoidance notch; 52, support sheet; 6, plastic frame; 61, locking hole; 62, blocking member; 63, bump; 7, outer frame; 64, screw avoidance hole; 65, COF avoidance hole; 71, cutout; 8, diaphragm assembly; 9, cover plate; 10, display panel; 11, screw; and 12 stud.

An embodiment of the present disclosure provides a backlight module. As shown in FIGS. 1-6, the backlight module includes a back panel 1, a light guide plate 2 and a light bar 3.

The back panel 1 has a bottom plate 101 and a peripheral plate 102 surrounding edges of the bottom plate 101, and the peripheral plate 102 is provided with a limit structure 1021 protruding into an area the surrounded by the peripheral plate 102. The light guide plate 2 is provided within the peripheral plate 102.

The light bar 3 is disposed between the peripheral plate 102 and the light guide plate 2 and abuts against the limit structure 1021 such that the light bar is blocked by the limit structure 1021 in at least one of a direction perpendicular to the bottom plate 101 and a circumferential direction of the peripheral plate 102.

In the backlight module of the embodiment of the present disclosure, the light bar 3 can be limited in at least one of the axial and circumferential directions of the peripheral plate 102 through the limit structure 1021, so that the light bar 3 is not easy to shake, thereby preventing the light emitting element 32 from being damaged. Therefore, the light-exiting effect will not be affected, and the display effect is ensured. At the same time, during assembly, the position of the light bar 3 can be limited by the limit structure 1021, which is convenient for quick and accurate installation of the light bar 3, and is beneficial to reducing installation errors.

Each part of the backlight module of the embodiment of the present disclosure will be described in detail below.

Figure 3:
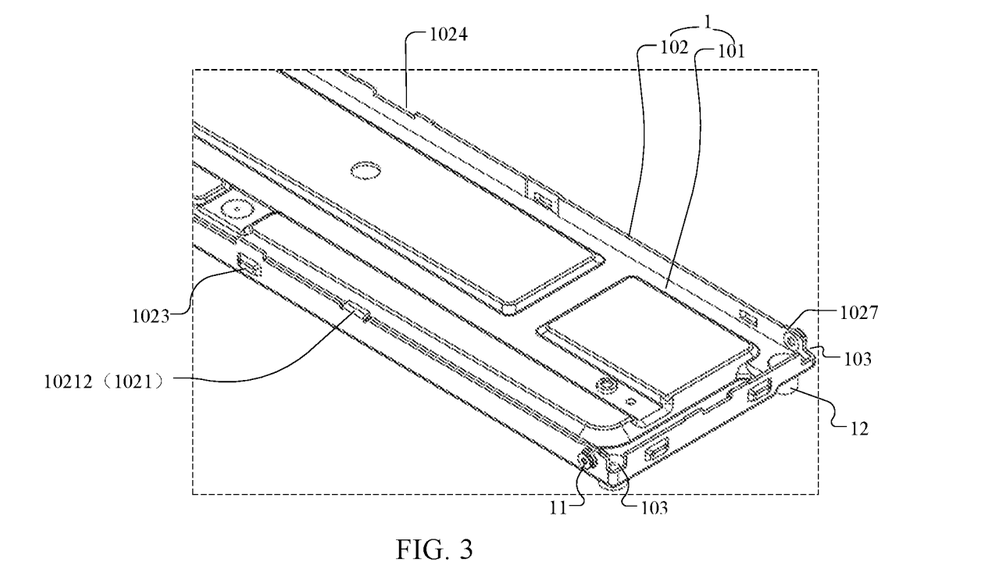
FIG. 3 is a partial view of a back panel in an embodiment of a display device of the present disclosure.

As shown in FIG. 3, the back panel 1 has the bottom plate 101 and the peripheral plate 102. The shape of the bottom plate 101 may be rectangular, circular, or polygonal, etc., which is not particularly limited here, and can be used to support various components on it. The shape of the peripheral plate 102 is matched with that of the bottom plate 101, and the peripheral plate can surround the edges of the bottom plate 101, extend toward a side of the bottom plate 101 and be used to limit components within the peripheral plate. The circumferential direction of the peripheral plate 102 is around a central axis that is a straight line passing through the center of the peripheral plate 102 and perpendicular to the bottom plate 101. The back panel 1 may be made of metal. For example, it may be formed of electro-galvanized steel plate. Of course, it may also be other materials such as plastic.

The peripheral plate 102 can be composed of multiple side plates, and a notch 103 is formed between adjacent two side plates, so that the side plate can be formed by bending the edge of the bottom plate 101 to one side. Of course, the peripheral plate 102 may also be a closed ring structure, which may be integrally formed with the bottom plate 101.

For example, the bottom plate 101 and the peripheral plate 102 are rectangular, and the peripheral plate 102 has four side plates, including two opposite long side plates and two opposite short side plates. There is the notch 103 between the adjacent long side plate and short side plate. During manufacture, the four corners of the bottom plate 101 are cut to form openings, and then the edges of the bottom plate 101 are bent to one side to form four side plates. The positions of the openings are the positions of the notches 103.

Figure 2:
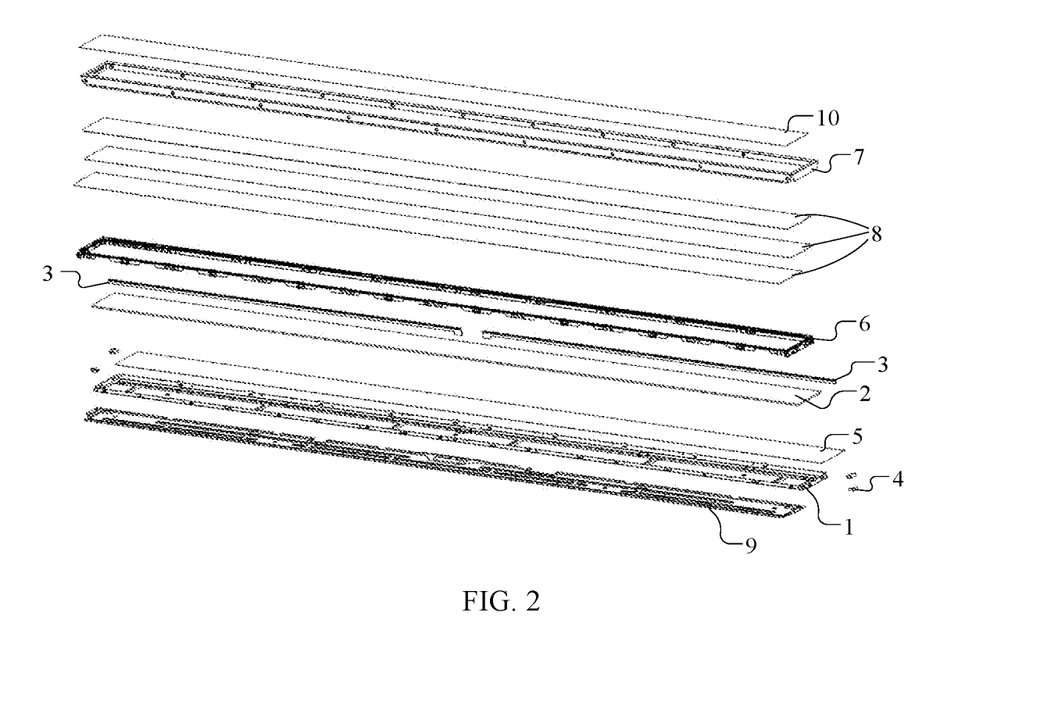
FIG. 2 is an exploded view of an embodiment of a display device of the present disclosure.
Figure 4:
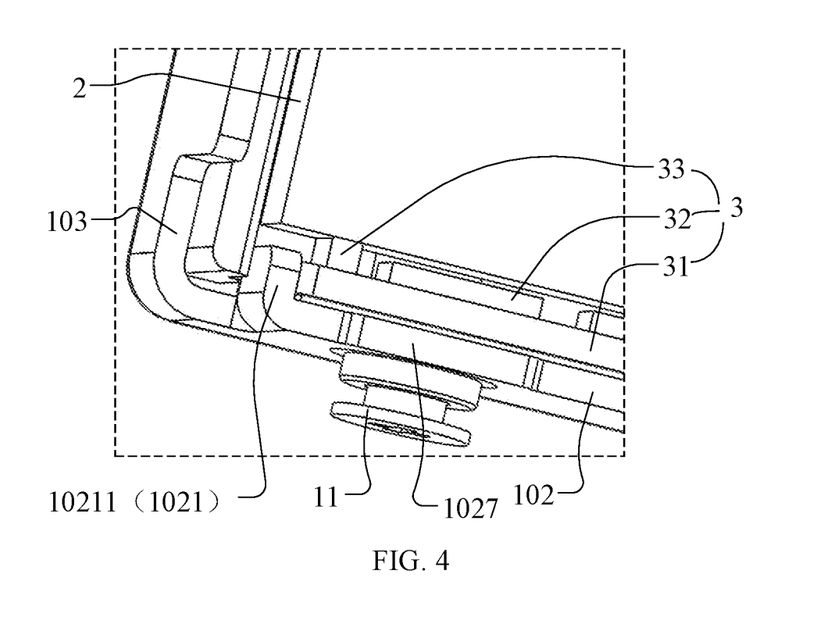
FIG. 4 is a partial view of a light guide plate and a light bar in an embodiment of a display device of the present disclosure.

As shown in FIGS. 2 and 4, the light guide plate 2 is a flat plate structure, and its shape matches the shape of the peripheral plate 102. For example, if the peripheral plate 102 is rectangular, the light guide plate 2 is rectangular, so that it can be provided within the peripheral plate 102. A side surface of the light guide plate 2 is a light incident surface, a surface of the light guide plate 2 facing away from the bottom plate 101 is a light-exiting surface, and a surface close to the bottom plate 101 is a back surface. A microstructure for improving the brightness can be formed on the light-exiting surface of the light guide plate 2 by processes such as printing or integral molding, so that brightness uniformity of the light-exiting surface is greater than 75%. The back surface of the light guide plate 2 has a dot area, and dots are formed by processes such as printing or integral molding within the dot area.

The dot area has a preset distance from each edge of the back surface. The light guide plate 2 with a rectangular shape is taken as an example. The back surface of the light guide plate 2 has two long sides and two short sides. The dot area is also rectangular. The distances between the two long sides of the dot area and the corresponding long sides of the back surface are 0.8 mm and 2.7 mm, respectively. The distances between the short sides of the dot area and the corresponding short sides of the back surface are 1.2 mm.

The light guide plate 2 may be made from a styrene-methyl methacrylate copolymer (MS) with an expansion ratio of 1.75×105. Of course, it may also be made from other materials such as acrylic.

Figure 5:
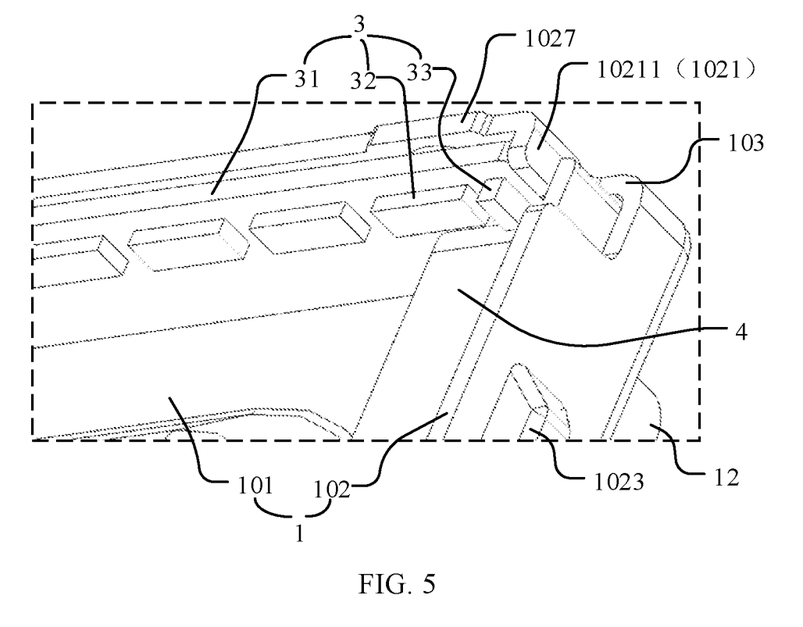
FIG. 5 is a partial view of a light bar and a back panel in an embodiment of a display device of the present disclosure.
Figure 6:
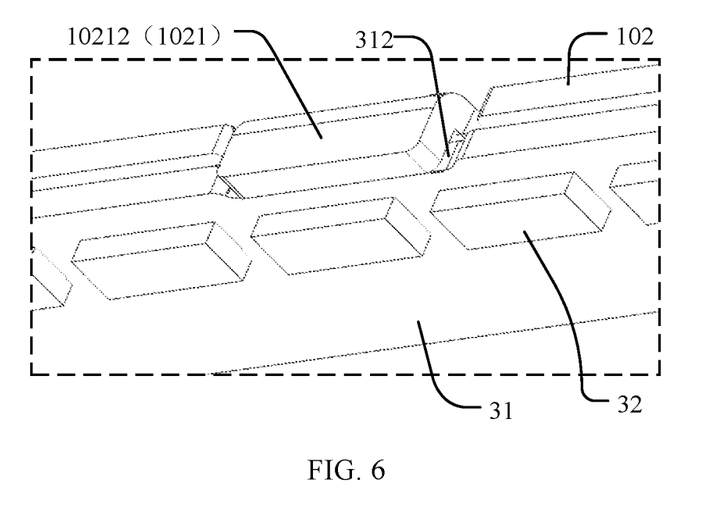
FIG. 6 is a partial view of a light bar and a clamping edge in an embodiment of a display device of the present disclosure.

As shown in FIGS. 4-6, the light bar 3 is disposed between the peripheral plate 102 and the light guide plate 2. Specifically, the light bar 3 is disposed between the peripheral plate 102 and the light incident surface of the light guide plate 2, and is used for emitting light toward the light incident surface. The light bar 3 may include a driving substrate 31, a light emitting element 32, and a spacer 33.

The driving substrate 31 may be in a strip shape, and is disposed parallel to the light incident surface of the light guide plate 2. The driving substrate 31 may be a PCB board. Its shape can match the shape of the space between the light guide plate 2 and the peripheral plate 102. For example, the peripheral plate 102 and the light guide plate 2 are both rectangular, the side plates of the peripheral plate 102 are parallel to the sides of the light guide plate 2, then the driving substrate 31 is rectangle.

The light emitting element 32 is provided on a surface of the driving substrate 31 close to the light guide plate 2, that is, the surface close to the light incident surface, and can emit light toward the light incident surface while driven by the driving substrate 31. The light-emitting element 32 may be a light-emitting diode (LED) or other light-emitting devices. The number of the light-emitting elements 32 may be plural, and the light-emitting elements 32 may be spaced along the longitudinal direction of the driving substrate 31. For example, the number of the light-emitting elements 32 is 112, and the distance between two adjacent light-emitting elements 32 is 5.34 mm to ensure sufficient light mixing. The distance between two adjacent light-emitting elements 32 is a distance between centers of the two adjacent light-emitting elements 32.

The light-emitting element 32 as an LED is taken as an example. The LED can use a PCT (poly 1,4-cyclohexane dimethylene terephthalate) bracket with a life of 50000 hrs, and phosphor of the LED can use YR powder with the color gamut NTSC 72%. The drive current of a single LED is 14 mA, the drive voltage is 3.0V, and the overall power consumption of the backlight module is 11.2 W.

As shown in FIG. 4, the spacer 33 is also provided on the surface of the driving substrate 31 close to the light guide plate 2, and also protrudes toward the light incident surface of the light guide plate 2. At the same time, a height of the spacer 33 is greater than a height of the light emitting element 32, so that the distance between the spacer 33 and the light incident surface of the light guide plate 2 is smaller than the distance between the light emitting element 32 and the light incident surface. The height of the spacer 33 is the distance between the surface of the spacer 33 facing away from the driving substrate 31 and the driving substrate 31. As such, when the vibration occurs, the spacer 33 can prevent the light emitting element 32 from colliding with the light guide plate 2 to avoid damage to the light emitting element 32 or the light guide plate 2. A difference between the height of the spacer 33 and the height of the light-emitting element 32 may be 0.25 mm, ensuring that the distance between the light-emitting element 32 and the light guide plate 2 is at least 0.25 mm.

For example, there are a plurality of light-emitting elements 32, which are arranged at intervals along the longitudinal direction of the driving substrate 31, and the spacer 33 can be disposed between two adjacent light-emitting elements 32, and the number of the spacers 33 can be multiple, for example, four. There is at most one spacer 33 between two adjacent light-emitting elements 32.

As shown in FIGS. 4 and 5, the peripheral plate 102 may be provided with a limit structure 1021 protruding toward the inner side of the surrounded area, and the light bar 3 may abut against the limit structure 1021 so that the light bae is blocked by the limit structure 1021 in at least one of a direction perpendicular to the bottom plate 101 and a circumferential direction of the peripheral plate 102. In this way, the position of the light bar 3 is limited, so that the light bar 3 is not easy to shake. For example, the light bar 3 may be limited between the limit structure 1021 and the bottom plate 101, and may also be limited between the limit structure 1021 and the side plate corresponding to the limit structure 1021. Especially for a strip display device, since the length of the light bar 3 is large, positioning is difficult during installation, and after being installed, the light bar 3 is easy to shake. The light bar 3 is blocked through the limit structure 1021. The limit structure 1021 is used for positioning the light bar 3 during installation, and used for preventing the light bar 3 from shaking after the installation.

In order to prevent the light bar 3 from moving along the circumferential direction of the peripheral plate 102, in some embodiments of the present disclosure, the limit structure 1021 may include a stopper 10211, and the stopper 10211 may be provided on the inner surface of the peripheral plate 102. The inner surface is the surface toward the central axis of the peripheral plate 102. When a display panel 10 is placed within the peripheral plate 102, the inner surface faces the display panel 10. An end of the light bar 3 can abut against the stopper 10211, so that the light bar 3 can be limited, blocking the light bar 3 from moving along the circumferential direction of the peripheral plate 102. On the other hand, the stopper 10211 can be used as a benchmark for positioning the light bar 3 during the installation of the light bar. The number of the light bars 3 may be multiple, and the light bars are successively distributed along a straight line with two adjacent light bars abutting each other. In two light bars located at two ends, one of the two light bars abuts against the stopper 10211, and the other may face the side plate of the peripheral plate 102 exactly opposite to the stopper 102. Thus, the light bar 3 can be prevented from moving along the peripheral plate 102, that is, along the circumferential direction. During installation, one end of one light bar 3 can abut against the stopper 10211, and then the other light bar 3 can be arranged in a straight line in a direction away from the stopper 10211, and adjacent two light bars 3 abut each other. In this process, the stopper 10211 can be used as a reference for determining the position of the light bar 3 so as to install the light bar 3 accurately and quickly. It should be noted that the fixing method of the light bar 3 is not particularly limited here, and the light bar 3 can be fixed by screws, or can also be fixed by other methods such as gluing.

For example, the peripheral plate 102 and the light guide plate 2 are both rectangular. The peripheral plate 102 includes a plurality of side plates. The number of the light bars 3 may be two. The driving substrates 31 of the two light bars 3 are arranged butt to butt in a straight line along the side plate parallel to the light incident surface corresponding to the light guide plate 2. In addition, one end of one driving substrate 31 abuts against the stopper 10211, the other end abuts against one end of the other driving substrate 31. The shape of the stopper 10211 is not particularly limited here. It can be formed by bending the side corresponding to the notches 103 on both sides of the side plate corresponding to the light incident surface of the light guide plate 2 to the light guide plate 2.

Of course, two opposite stoppers 10211 may also be provided on the side plate corresponding to the light incident surface, and the light bar 3 is sandwiched between the two stoppers 10211.

Figure 16:
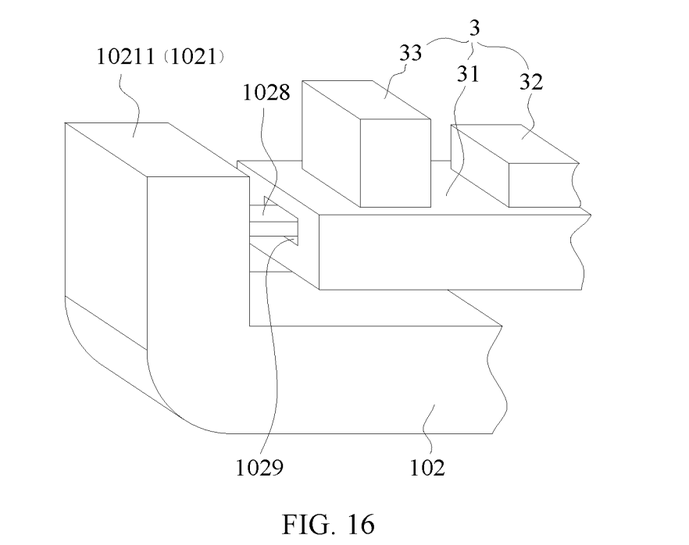
FIG. 16 is a schematic diagram of a buckle and a groove in an embodiment of a display device of the present disclosure.

In addition, in order to make the engagement of the light bar 3 and the stopper 10211 more firm, in an embodiment of the present disclosure, as shown in FIG. 16, a buckle 1028 may be provided at the position of the stopper 10211 corresponding to the light bar 3. The buckle 1028 may be a lug boss. A groove 1029 is provided at the position of the light bar 3 corresponding to the buckle 1028, and the buckle 1028 is engaged with the groove 1029 to further prevent the light bar 3 from shaking. Alternatively, in another embodiment of the present disclosure, the positions of the buckle 1028 and the groove 1029 can also be interchanged. That is, the groove is provided at the position of the stopper 10211 corresponding to the light bar 3, and the buckle is provided at the position of the light bar 3 corresponding to the groove, the buckle is engaged with the groove.

As shown in FIG. 6, in order to prevent the light bar 3 from moving away from the bottom plate 101, that is, to block the light bar 3 in a direction perpendicular to the bottom plate 101, in some embodiments of the present disclosure, the limit structure 1021 may include a clamping edge 10212. The clamping edge 10212 can be disposed on the edge of the peripheral plate 102 away from the bottom plate 101 and extending toward the light guide plate 2, the light bar 3 can be limited between the bottom plate 101 and the clamping edge 10212. For example, the driving substrate 31 of the light bar 3 is defined between the bottom plate 101 and the clamping edge 10212.

Further, as shown in FIG. 6, the side of the driving substrate 31 facing away from the bottom plate 101 is provided with a limit groove 312, and the clamping edge 10212 is fitted in the limit groove 312, so that it can prevent the relative movement of the back panel 1 and the light bar 3 in the length direction of the light bar 3 through the cooperation of the limit groove 312 and the clamping edge 10212.

It should be noted that the limit structure 1021 may include both of the above-mentioned stopper 10211 and the clamping edge 10212, or may include only any one of them.

Figure 7:
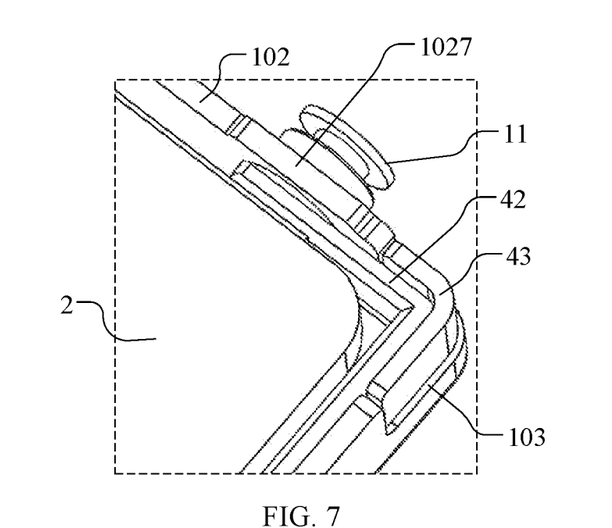
FIG. 7 is a partial view of a light guide plate and an elastic liner in an embodiment of a display device of the present disclosure.
Figure 9:
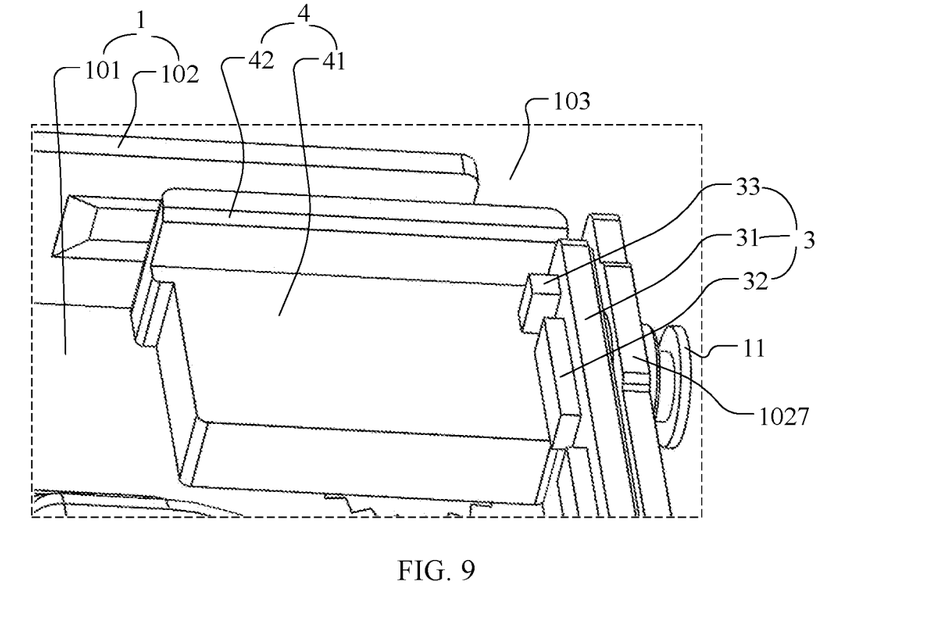
FIG. 9 is another partial view of an elastic liner and a back panel in an embodiment of a display device of the present disclosure.

In some embodiments of the present disclosure, as shown in FIGS. 2 and 7, the backlight module of the present disclosure may further include a plurality of elastic liners 4, and each of the elastic liners 4 is disposed within the peripheral plate 102 in a one-to-one correspondence with each notch 103. For example, the peripheral plate 102 is rectangular and the number of notches 103 is four, then the number of elastic liners 4 is also four, and the four elastic liners 4 correspond to the four notches 103, respectively. As shown in FIG. 9, each elastic liner 4 includes a support portion 41 and a limit portion 42.

The support portion 41 is a flat plate structure, which is located on the bottom plate 101, and its shape matches the shape of the peripheral plate 102 in the area on both sides of the notch 103.

The limit portion 42 is provided on the surface of the support portion 41 facing away from the bottom plate 101 and is attached to the inner wall of the peripheral plate 102. Further, each limit portion 42 is sandwiched between the light guide plate 2 and the peripheral plate 102, thereby compressing the light guide plate 2 tightly through the limit portion 42, and playing a buffering role.

Figure 8:
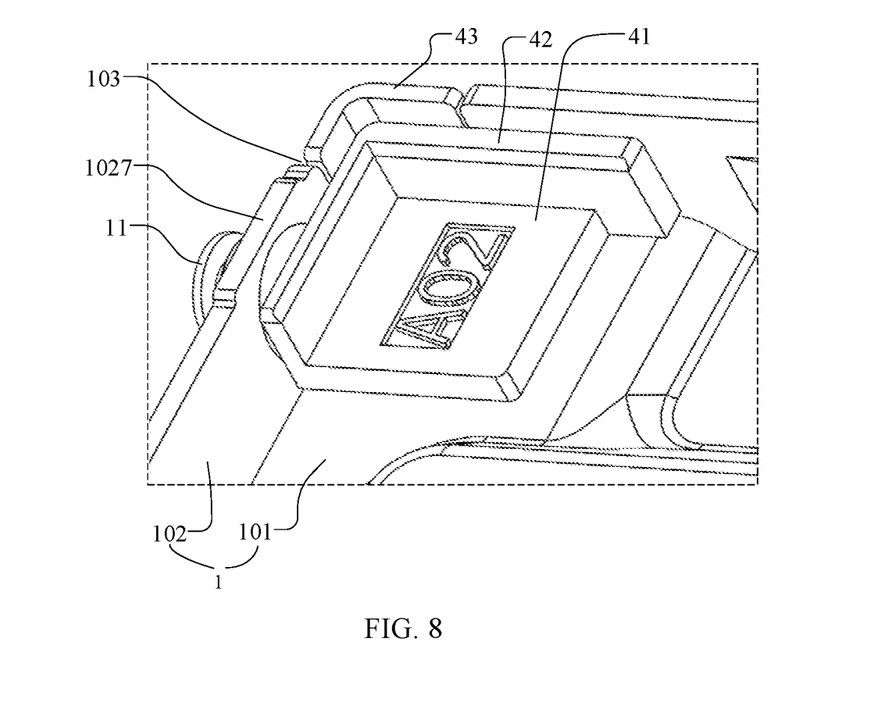
FIG. 8 is a partial view of an elastic liner and a back panel in an embodiment of a display device of the present disclosure.

In addition, as shown in FIG. 8, in an embodiment, the elastic liner 4 may further include a filling portion 43, located on the surface of the limit portion 42 facing away from the light guide plate 2 and is filled in the corresponding notch 103. In this way, the strength of the peripheral plate 102 is enhanced so that the peripheral plate 102 is difficult to deform. Further, in order to avoid interference with the outer peripheral surface of the peripheral plate 102, the surface of the filling part 43 facing away from the light guide plate 2 may be an arc surface that smoothly transitions with the outer peripheral surface of the peripheral plate 102, thereby forming a complete ring shape with the peripheral plate 102.

The support portion 41, the limit portion 42 and the filling portion 43 may be an integrated structure, and may be made from polycarbonate (PC) or other elastic materials, which will not be listed here.

It should be noted that, in the backlight module of the present disclosure, if a plurality of elastic liners 4 are used, the plurality of elastic liners 4 are not necessary to adopt the same structure. The embodiment in which two or more types of elastic liners 4 are used can be adopted.

Figure 10:
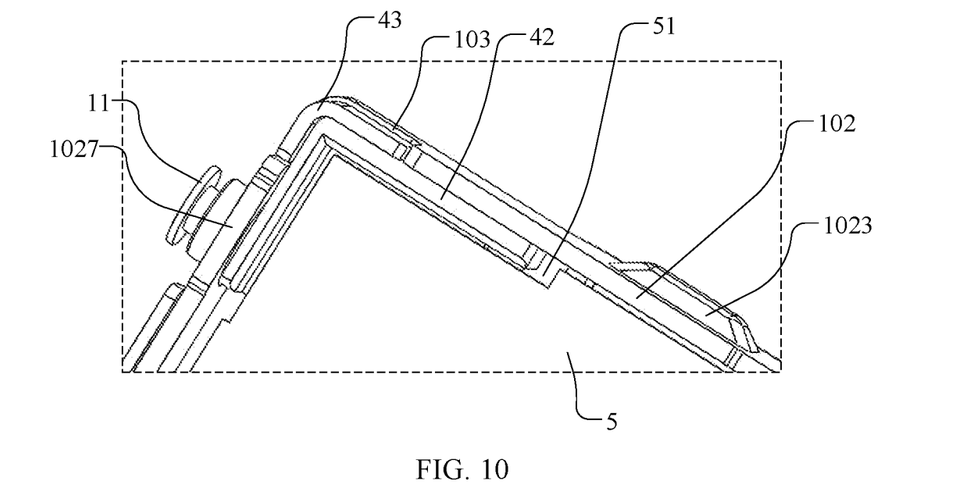
FIG. 10 is a partial view of an avoidance notch of a reflective sheet and an elastic liner in an embodiment of a display device of the present disclosure.

In some embodiments of the present disclosure, as shown in FIGS. 2 and 10, the backlight module may further include a reflective sheet 5. The reflective sheet 5 is disposed within the peripheral plate 102, and the reflective sheet 5 is at least partially located between the light guide plate 2 and the support portion 41 of the elastic liner 4, and is located on the side of the light bar 3 close to the bottom plate 101. Specifically, the reflective sheet 5 is put up the surface of the support portion 41 of each elastic liner 4 facing away from the bottom plate 101. The back surface of the light guide plate 2 is provided on the surface of the reflective sheet 5 facing away from the bottom plate 101. The edges of the reflective sheet 5 are matched with each limit portion 42, so that the reflective sheet 5 can be positioned through the limit portion 42. Further, the light-emitting element 32 and the spacer 33 of the light bar 3 are located on the side of the reflective sheet 5 facing away from the support portion 41, and the spacer 33 can be compressed and attached to the surface of the reflective sheet 5 facing away from the support portion 41.

The thickness of the reflective sheet 5 may be 0.255 mm, and the reflectance may be 97%. The surface of the reflective sheet 5 close to the light guide plate 2 may be formed with a protective layer to protect the dots on the back surface of the light guide plate 2 from scratches.

Figure 11:
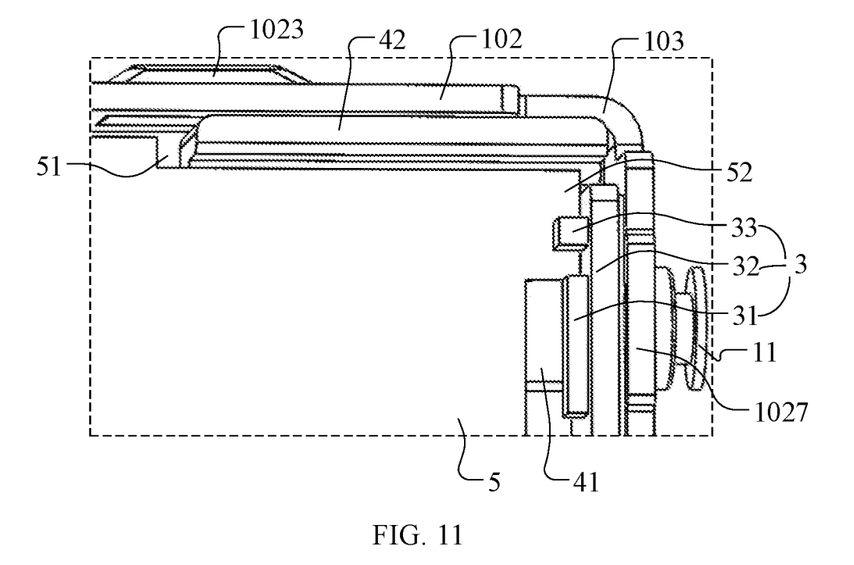
FIG. 11 is a partial view of a support sheet of a reflection sheet and a light bar in an embodiment of a display device of the present disclosure.

For example, as shown in FIGS. 10 and 11, the peripheral plate 102 and the reflective sheet 5 are both rectangular, and the peripheral plate 102 include two long side plates and two short side plates, and the side of the reflective sheet 5 corresponding to the short side plate is provided with an avoidance notch 51 matched with the limit portion 42. The shape of the avoidance notch 51 matches the corresponding limit portion 42. The side of the reflective sheet 5 corresponding to the long side plate is provided with a support sheet 52. The support sheet 52 abuts against the corresponding side plate, thereby preventing the reflective sheet 5 from sliding into the side of the light bar 3 close to the bottom plate 101, causing a hotspot phenomenon of uneven brightness, of course, the support sheet 52 can also abut against the limit portion 42 attached to the corresponding side plate.

Figure 12:
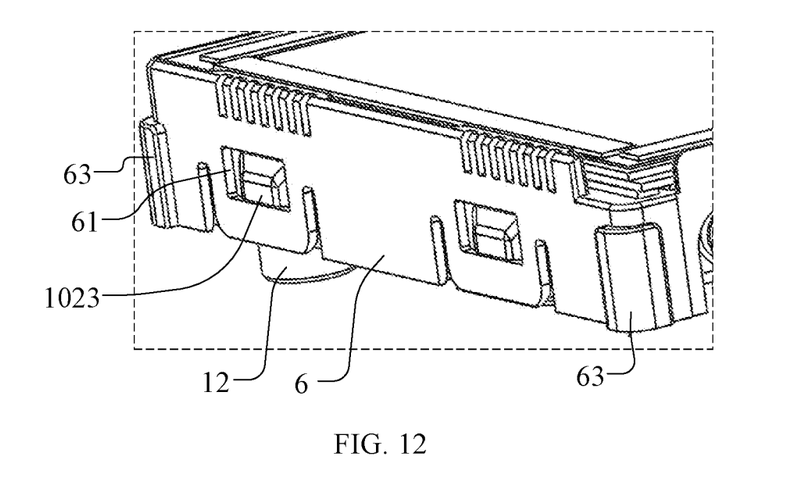
FIG. 12 is a partial view of a plastic frame and a back panel in an embodiment of a display device of the present disclosure.

In some embodiments of the present disclosure, as shown in FIGS. 2 and 12, the backlight module may further include a plastic frame 6, which may be made of the polycarbonate (PC) and 10% glass fiber (GF) material. The plastic frame 6 surrounds the peripheral plate 102. As shown in FIG. 3, the outer side of the peripheral plate 102 is provided with a hook 1023. The plastic frame 6 is provided with a locking hole 61 at the position corresponding to the hook 1023. The hook 1023 is snapped into the hole 61 so that the plastic frame 6 is fixed on the back panel 1.

For example, as shown in FIGS. 3 and 12, the peripheral plate 102 is rectangular, and the peripheral plate 102 include two long side plates and two short side plates, and the two long side plates are provided with multiple hooks 1023, the length of the hook 1023 can be 8 mm, and the width can be 3.5 mm. The number of the hooks 1023 is different. The side with the smaller number of the hooks 1023 is a top side, that is, the long side plate located above after being installed in an erect direction. The side with the greater number of the hooks 1023 is a ground side, that is, the long side plate located below after being installed in the erect direction. The number of the locking holes 61 is the same as that of the hooks 1023, and the hooks 1023 are snapped into the holes 61 in one-to-one correspondence. The number of hooks 1023 on the top side can be 8, and the distance between two adjacent hooks 1023 on the top side is 149 mm; the ground side carries a stronger force, the number of hooks 1023 can be 10, and the distance between two adjacent hooks 1023 on the ground side is 119.2 mm. At the same time, the two short side plates can be provided with two hooks 1023 with a distance of 30 mm. In addition, in order to ensure the smooth installation of the hook 1023 and the hole 61, there may be a gap of 0.1 mm between the hook 1023 and the hole 61.

In some embodiments of the present disclosure, as shown in FIG. 5, the peripheral plate 102 may be provided with mounting holes, and the mounting holes may be used to install screws 11. The surface of the peripheral plate 102 facing away from the bottom plate 101 is provided with a positioning stage 1027 protruding in a direction away from the bottom plate 101. The plastic frame 6 is formed with a flange (not shown) inward at a position corresponding to the positioning stage 1027. The flange is provided with a positioning groove (not shown). The positioning stage 1027 is limited to the positioning groove to position the plastic frame 6 to prevent the plastic frame 6 from eversion.

The positioning stage 1027 may correspond to the mounting hole provided on the peripheral plate 102, that is, the projection of the positioning stage 1027 on the bottom plate 101 covers the projection of the mounting hole on the bottom plate 101, thereby increasing the height of the peripheral plate 102 at the mounting hole to increase the strength of this position. Alternatively, the positioning stage 1027 may also be located at a position directly opposite to the hook 1023 or other positions, which is not specifically limited herein. At the same time, the number of positioning stages 1027 may be multiple and distributed along the circumference of the peripheral plate 102, but the structure of different positioning stages 1027 may be different as long as the same effect can be achieved.

Figure 1:
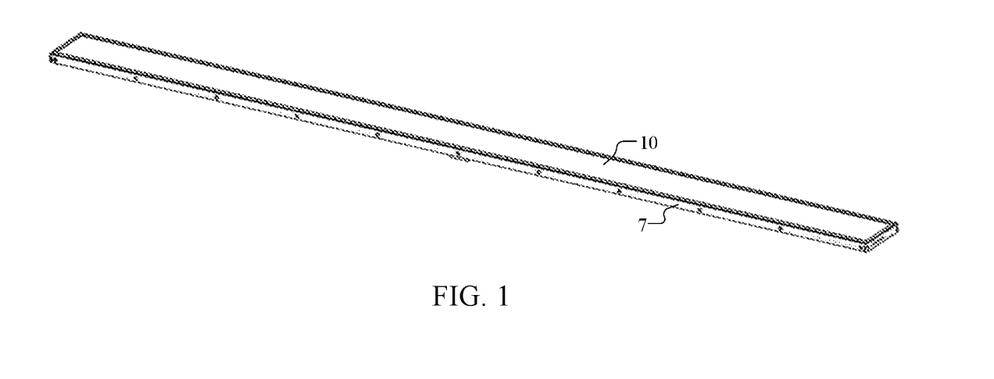
FIG. 1 is an assembly diagram of an embodiment of a display device of the present disclosure.

In some embodiments of the present disclosure, as shown in FIGS. 1 and 2, the backlight module may further include an outer frame 7, which may be sleeved outside the plastic frame 6, and the outer frame 7 may be made of metal, plastic, etc., and can define the shape of the plastic frame 6. The outer frame 7 and the peripheral plate 102 can be connected by the screws 11 described above. The edge of the side wall of the outer frame 7 may be provided with cutouts 71, the number of which may be one or more, so that the side wall may be deformed, which is convenient for installation. For example, the shape of the outer frame 7 is rectangular, and the number of the cutouts 71 may be four, which are located at the four corners of the outer frame 7.

In addition, if the outer frame 7 is rectangular, the aspect ratio can be 24:1, and the width of the two longer side walls is 6.4 mm, and the width of the two shorter side walls is 5.7 mm and 7.3 mm, respectively. The thickness of each side wall of the outer frame 7 is 14.5 mm.

Figure 14:
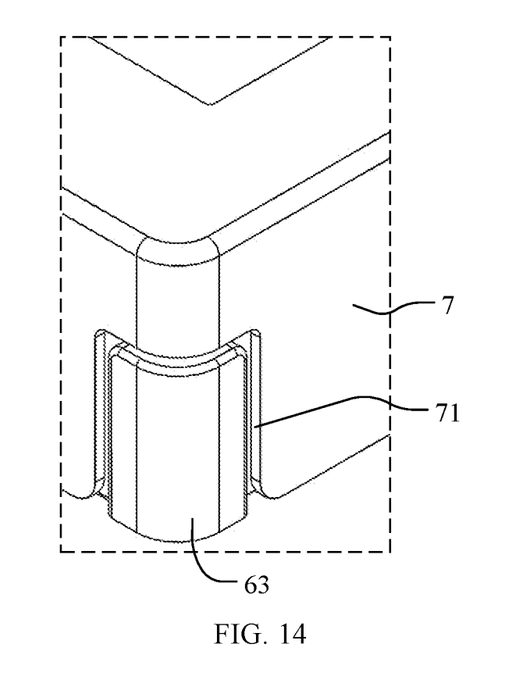
FIG. 14 is a partial view of an outer frame and a plastic frame in an embodiment of a display device of the present disclosure.

As shown in FIG. 14, in order to improve the strength of the outer frame 7, the outer periphery of the plastic frame 6 may be provided with bumps 63, the number of which is the same as the number of the cutouts 71, and filled in the cutouts 71 one by one correspondingly to increase the strength at the cutouts 71. At the same time, the installation of the outer frame 7 can also be guided and positioned through the cooperation of the bump 63 and the cutout 71. The bump 63 can be integrally formed with the plastic frame 6. Further, the outer peripheral surface of the bump 63 may be an arc surface that smoothly transitions with the outer peripheral surface of the outer frame 7.

In addition, the plastic frame 6 may also be provided with a screw avoidance hole 64 and a COF avoidance hole 65. The screw avoidance hole 64 may be directly opposite to the mounting hole of the peripheral plate 102 for avoiding the screw 11 connecting the outer frame 7 and the back panel 1.

In some embodiments of the present disclosure, as shown in FIG. 2, the backlight module further includes a diaphragm assembly 8, which may be disposed on a side of the light guide plate 2 facing away from the bottom plate 101 and located within the peripheral plate 102. The diaphragm assembly 8 includes a multi-layered diaphragms arranged in a stack, and at least a part of the diaphragms is provided with a lug on the outer periphery. A positioning port 1024 is provided at a position of the peripheral plate 102 corresponding to the lug. The lug extends into the positioning port 1024, so that the diaphragm can be positioned. For example, each diaphragm of the diaphragm assembly 8 may include a brightness enhancement diaphragm and two diffusion diaphragms located on the side of the brightness enhancement diaphragm away from the light guide plate 2. Both the brightness enhancement diaphragm and the diffusion diaphragm may be limited within the peripheral plate 102 through the lug and the positioning port 1024.

It should be noted that orthographic projections of lugs on the respective diaphragms on the light guide plate 2 can coincide, so that they can extend into the same positioning port 1024 for limitation.

Figure 13:
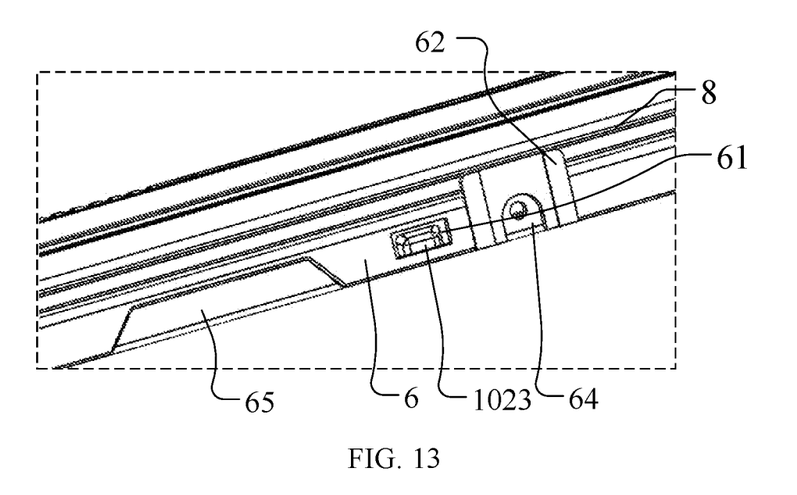
FIG. 13 is a partial view of a diaphragm assembly and a plastic frame in an embodiment of a display device of the present disclosure.

In some embodiments of the present disclosure, as shown in FIGS. 1, 2 and 13, the plastic frame 6 is provided with a plurality of blocking members 62 protruding in a direction away from the bottom plate 101, and the blocking members 62 are integrated with the plastic frame 6. Of course, they can also be an independent structure with fixed connection. When the display panel 10 is assembled, the diaphragm assembly 8 can be placed in the plastic frame 6, and the diaphragm assembly 8 can be blocked by the blocking members 62. For example, the plastic frame 6 and the peripheral plate 102 are both rectangular, and the blocking members 62 can be provided on the side of the long side board of the plastic frame 6 corresponding to the top side of the peripheral plate 102, and the number can be 19. Of course, other sides of the plastic frame 6 may also be provided with the blocking members 62.

Figure 15:
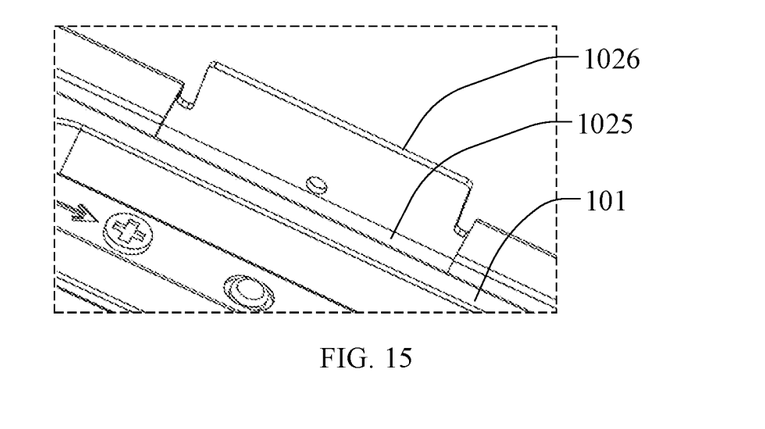
FIG. 15 is a schematic diagram of a threading port and a baffle in an embodiment of a display device of the present disclosure.

In addition, as shown in FIG. 15, a threading port 1025, through which cables may pass, may be provided at a position of the peripheral plate 102 corresponding to the driving substrate 31, so as to connect the control circuit with the driving substrate 31. A baffle 1026 covering the threading port 1025 is bridged at the threading port 1025 to protect the cable passing through the threading port 1025.

As shown in FIG. 2, the side of the bottom plate 101 of the back panel 1 facing away from the light guide plate 2 may be provided with a cover plate 9 for fixing the circuit mounted on the side of the bottom plate 101 away from the light guide plate 2. In addition, as shown in FIG. 2, the surface of the bottom plate 101 facing away from the light guide plate 2 can be fixed with a stud 12 by riveting or integral molding, etc. The stud 12 passes through the cover 9 and the backlight module can be connected to an external bracket or other structure through the screw matching the stud 12, so as to fix the assembled display device to the external support or other structure.

As shown in FIGS. 1 and 2, embodiments of the present disclosure provide a display device including the backlight module of the above embodiments and the display panel 10. For the specific structure and beneficial effects of the backlight module, reference can be made to the above embodiments, which will not be detailed here. The display panel 10 can be disposed on the light-exiting side of the backlight module, and is located within the peripheral plate 102 of the backboard 1. The display panel 10 may include an array substrate and a color filter substrate provided in a box-to-box manner. The display device can be used for an electronic price tag to display information such as the price of an item, and can also display a dynamic picture, or can also be used for a mobile phone, a tablet computer, and electronic paper, etc., which are not particularly limited herein.

Embodiments of the present disclosure further provide an electronic apparatus including the above-mentioned display device. The electronic apparatus may be an electronic price tag, used to display information such as the price of an item, and a dynamic image. Of course, it can also be a mobile phone, tablet computer, electronic paper, etc., which is not specifically limited here.

Other embodiments of the present disclosure will be apparent to those skilled in the art. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

What is claimed is:

1. A backlight module, comprising:
   a back panel with a bottom plate and a peripheral plate surrounding edges of the bottom plate, wherein the peripheral plate is provided with a limit structure protruding into an area surrounded by the peripheral plate;

a light guide plate disposed within the peripheral plate; and a light bar disposed between the peripheral plate and the light guide plate and abutting against the limit structure such that the light bar is blocked by the limit structure in at least one of a direction perpendicular to the bottom plate and a circumferential direction of the peripheral plate, wherein the limit structure comprises: a stopper, disposed on an inner surface of the peripheral plate, wherein an end of the light bar abuts against the stopper such that the light bar is blocked by the stopper in the circumferential direction of the peripheral plate, wherein the stopper is provided with a buckle at a position corresponding to the light bar, and the light bar is provided with a groove at a position corresponding to the buckle, and the buckle is engaged with the groove, or the stopper is provided with a groove at a position corresponding to the light bar, and the light bar is provided with a buckle at a position corresponding to the groove, the buckle is engaged with the groove.

2. The backlight module according to claim 1, wherein the backlight module has multiple sub-light bars, and the sub-light bars are sequentially arranged along a straight line with any two adjacent sub-light bars abutting against each other, and one of two sub-light bars at two ends abuts against the stopper.

3. The backlight module according to claim 1, wherein the limit structure comprises:
a clamping edge, provided on an edge of the peripheral plate facing away from the bottom plate and extending toward the light guide plate, wherein the light bar is limited between the bottom plate and the clamping edge such that the light bar is blocked by the clamping edge the direction perpendicular to the bottom plate.

4. The backlight module according to claim 3, wherein a limit groove is provided on a side of the light bar facing away from the bottom plate, and the clamping edge is engaged with the limit groove.

5. The backlight module according to claim 1, wherein the light bar comprises a driving substrate, a light emitting element and a spacer, wherein the driving substrate abuts against the limit structure, the light emitting element and the spacer are both provided on a surface of the driving substrate close to the light guide plate, and a height of the spacer is greater than a height of the light emitting element.

6. The backlight module according to claim 1, further comprising:
at least one elastic liner provided on an inner side of the peripheral plate and comprising a support portion and a limit portion, wherein the support portion is located on the bottom plate, the limit portion is provided on a surface of the support portion facing away from the bottom plate and is attached to an inner wall of the peripheral plate, and the limit portion is sandwiched between the light guide plate and the peripheral plate.

7. The backlight module according to claim 6, wherein the peripheral plate is formed by a plurality of side plates, and a notch is formed between adjacent two side plates; the elastic liner comprises multiple elastic liners, and each of the elastic liners has a one-to-one correspondence with the notch, wherein each of the elastic liners further comprises:
a filling part, located on a surface of the limit portion facing away from the light guide plate, and filled in the corresponding notch.

8. The backlight module according to claim 7, further comprising:
a reflection sheet, disposed within the peripheral plate, wherein the reflection sheet is at least partially located between the light guide plate and the support portion, and an edge of the reflection sheet is matched with each limit portion.

9. The backlight module according to claim 8, wherein the edge of the reflective sheet is provided with an avoidance notch matched with the limit portion, and a side of the reflective sheet corresponding to the light bar is provided with a support sheet abutting against the light bar.

10. The backlight module according to claim 1, wherein an outer side of the peripheral plate is provided with a hook, and the backlight module further comprises:
a plastic frame surrounding the peripheral plate, wherein the plastic frame is provided with a locking hole at a position corresponding to the hook, and the hook is snapped into the locking hole; and
an outer frame sleeved outside the plastic frame, wherein side walls of the outer frame is provided with a cutout, and a bump is provided on an outer periphery of the plastic frame, and the bump is filled in the cutout.

11. The backlight module according to claim 10, wherein the peripheral plate is provided with a mounting hole, and a surface of the peripheral plate facing away from the bottom plate is provided with a positioning stage protruding in a direction away from the bottom plate, a projection of the positioning stage on the bottom plate covers a projection of the mounting hole on the bottom plate, the plastic frame is provided with a positioning groove at a position corresponding to the positioning stage, and positioning stage is limited to the positioning groove.

12. A display device comprising a backlight module, wherein the backlight module comprises:
a back panel with a bottom plate and a peripheral plate surrounding edges of the bottom plate, wherein the peripheral plate is provided with a limit structure protruding into an area surrounded by the peripheral plate;
a light guide plate disposed within the peripheral plate; and
a light bar disposed between the peripheral plate and the light guide plate and abutting against the limit structure such that the light bar is blocked by the limit structure in at least one of a direction perpendicular to the bottom plate and a circumferential direction of the peripheral plate,
wherein the limit structure comprises: a stopper, disposed on an inner surface of the peripheral plate, wherein an end of the light bar abuts against the stopper such that the light bar is blocked by the stopper in the circumferential direction of the peripheral plate,
wherein the stopper is provided with a buckle at a position corresponding to the light bar, and the light bar is provided with a groove at a position corresponding to the buckle, and the buckle is engaged with the groove, or
the stopper is provided with a groove at a position corresponding to the light bar, and the light bar is provided with a buckle at a position corresponding to the groove, the buckle is engaged with the groove.

13. The display device of claim 12, wherein the display device is part of an electronic apparatus.

14. The display device according to claim 12, wherein the limit structure comprises:

a clamping edge, provided on an edge of the peripheral plate facing away from the bottom plate and extending toward the light guide plate, wherein the light bar is limited between the bottom plate and the clamping edge such that the light bar is blocked by the clamping edge in the direction perpendicular to the bottom plate.

15. The display device according to claim 12, wherein the light bar comprises a driving substrate, a light emitting element and a spacer, wherein the driving substrate abuts against the limit structure, the light emitting element and the spacer are both provided on a surface of the driving substrate close to the light guide plate, and a height of the spacer is greater than a height of the light emitting element.

16. The display device according to claim 12, wherein the backlight module further comprises:
   at least one elastic liner provided on an inner side of the peripheral plate and comprising a support portion and a limit portion, wherein the support portion is located on the bottom plate, the limit portion is provided on a surface of the support portion facing away from the bottom plate and is attached to an inner wall of the peripheral plate, and the limit portion is sandwiched between the light guide plate and the peripheral plate.

* * * * *